July 15, 1941.  A. L. McHUGH  2,249,021
OILING DEVICE
Filed Nov. 18, 1938

INVENTOR
Anthony L. McHugh
BY
HIS ATTORNEY.

Patented July 15, 1941

2,249,021

UNITED STATES PATENT OFFICE 2,249,021

OILING DEVICE

Anthony L. McHugh, Easton, Pa., assignor to Ingersoll-Rand Company, Jersey City, N. J., a corporation of New Jersey Application November 18, 1938, Serial No. 241,208

2 Claims. (Cl. 308—76)

This invention relates to oiling devices, and more particularly to an oiling device for supplying oil to the bearings of a rotatable shaft.

One object of the invention is to assure an adequate supply of oil to the bearings.

Another object is to effect a thorough cooling of the oil prior to its delivery to the bearings.

Other objects will be in part obvious and in part pointed out hereinafter.

Figure 1:
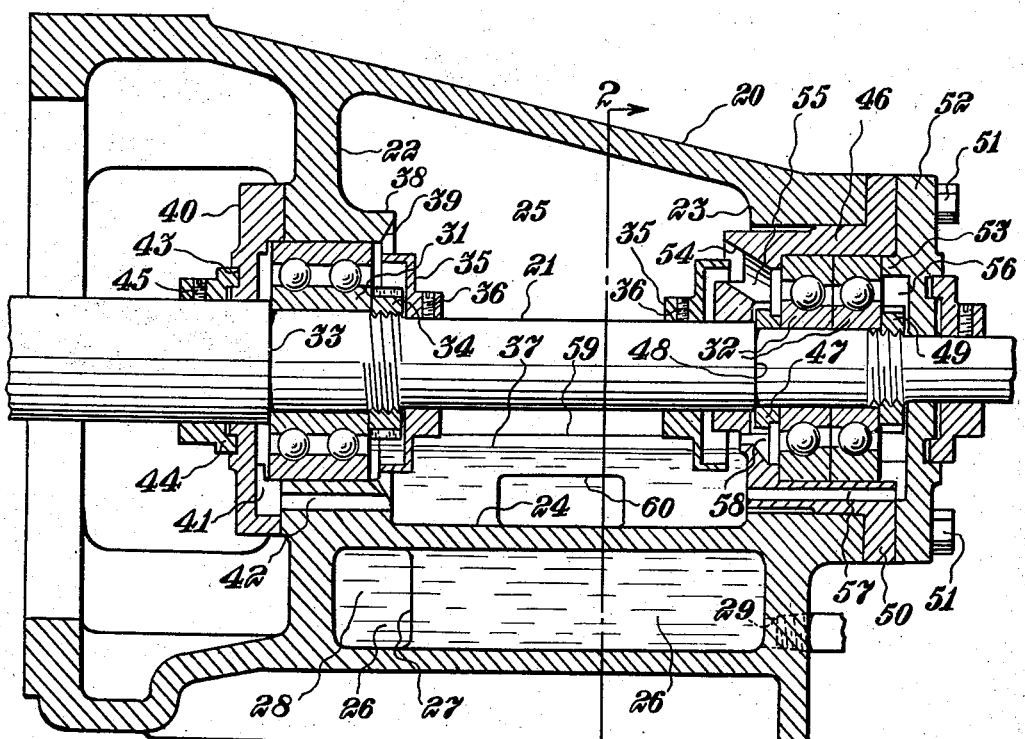
Figure 2:
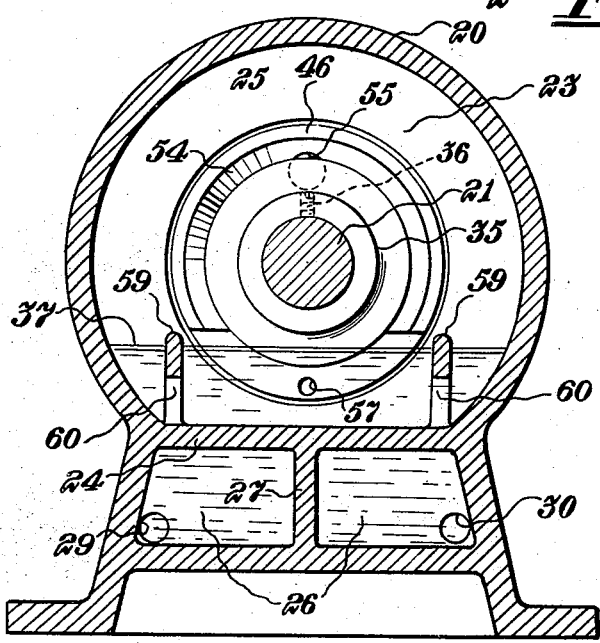

In the drawing accompanying this specification and in which similar reference numerals refer to similar parts, Figure 1 is a longitudinal sectional elevation of a bearing equipped with an oiling device constructed in accordance with the practice of the invention, and Figure 2 is a transverse view taken through Figure 1 on the line 2—2.

Referring more particularly to the drawing, 20 designates a casing and 21 a shaft extending longitudinally therethrough.

The casing 20 is provided with transverse walls 22 and 23 to support the shaft 21. Near the bottom of the casing is a horizontal wall 24 that joins the walls 22 and 23 and separates the interior of the casing into a reservoir 25 for oil and a chamber 26 for cooling medium.

The chamber 26 is located in the lower portion of the casing 20 beneath the wall 24 and has a wall 27 that extends from the wall 23 along the top and bottom of the chamber 26 and terminates near the wall 22, thereby leaving an opening 28 through which cooling liquid may flow from one side of the chamber to the other. The cooling medium is introduced into one side of the chamber 26 through a port 29 in the wall 23 and leaves the chamber through a port 30, also in the wall 23.

The shaft 21 extends through the reservoir 25 and is seated in the inner races of an anti-friction bearing 31 in the wall 22 and a pair of anti-friction thrust bearings 32 in the wall 23. The bearing 31 abuts a shoulder 33 on the shaft 21 and is clamped against said shoulder by a nut 34 threaded upon the shaft.

In order to assure the adequate lubrication of the bearing 31 the shaft 21 is provided with a cup-shaped disc 35 that is attached to the shaft by means of a set-screw 36 and is of such diameter that its lower portion extends into the oil 37 in the reservoir 25. On the wall 22 is a boss 38 which projects into the transverse plane of the disc 35 and has a bevelled surface 39 to guide the oil cast thereagainst, by the disc, to the bearing 31.

On the opposite side of the wall 22 is a cover 40 which encircles the shaft 21 and has a chamber 41 to receive such oil as may pass between the races of the bearing 31. A passage 42 in the wall 22 serves as an outlet for the chamber 41 and opens into the reservoir 25.

The cover 40 may be secured in position in any suitable manner and has an annular groove 43 on its outer surface to receive an oil ring 44 serving to restrain such oil as may pass between the shaft 21 and the cover 40. The oil ring 44 is rotatable with the shaft and is secured thereto by a screw 45 threaded into the oil ring and seating against the surface of the shaft.

The thrust bearings 32 are arranged in abutting relationship on the shaft 21 and in a container 46 disposed in the wall 23. A sleeve 47 is interposed between the innermost of the bearings 32 and a shoulder 48 on the shaft 21 and the sleeve 47 and the bearings are secured in position by a nut 49 threaded on the shaft. In the arrangement shown the container 46 has a lateral flange 50 that seats against the end of the casing 20 and is secured thereto by screws 51 which also serve to clamp a cover 52 to the outer end of the container 46. The cover 52 encircles the shaft and has an annular rib 53 on its inner surface to act as an abutment for the outer race of the adjacent bearing 32.

The bearings 32 are lubricated substantially in the same manner as the bearing 1. The shaft 21 is accordingly provided with a second cup-shaped disc 35 secured to the shaft by a screw 36 at the inner end of the container 46 and extends part way into a groove 54 in the adjacent surface of the container so that, during the rotation of the shaft, the disc 35 will splash oil directly into the groove 54. In the upper portion of the container, and leading from the groove 54, is a passage 55 to convey oil from the groove 54 to the upper portion of the adjacent bearing 32 whence such oil may flow into the outermost bearing 32 into a chamber 56 in the inner surface of the cover 52.

A passage 57 in the wall of the container 46 conveys such oil as may accumulate in the chamber 56 to the reservoir. Preferably a passage 58 is also formed in the inner end of the container 46 to return oil directly from the lower portions of the spaces between the races of the bearings 32 to the reservoir 25.

In order that the oil may be delivered to the discs 35 in a thoroughly cooled condition the reservoir 25 is provided on opposite sides of the shaft with longitudinally extending walls 59 that serve as dams to entrap the oil that will flow down along the inner surface of the reservoir. The walls 59 extend from the wall 22 to the wall 23 and preferably project above the normal level of the oil in the reservoir. In the lower portions of the walls 59 and midway between the discs 35 are ports 60 through which the oil accumulating behind the walls 59 may flow to the space between the walls 59.

In practice, when the shaft 21 is set in operation the discs 35 will be whirled through the oil 37 in the reservoir 25 and the oil adhering to the discs will be cast outwardly against the surface 39 and the surface of the groove 54, thence pass through the spaces between the races of the antifriction bearings into the chambers 41 and 56 and return to the reservoir through the passages 42 and 57.

Any oil that may be thrown against the internal surfaces of the casing will flow downwardly into the spaces behind the walls 59, thence through the ports 60 into the portion of the reservoir lying between the walls 59. During its passage over the wall 24 the oil will be thoroughly cooled since the wall 24 itself is maintained at a low temperature by the cooling medium being circulated through the chamber 26.

I claim:

1. An oiling device, comprising a casing having a wall to divide the casing into a reservoir for oil and a passage for cooling medium, said wall forming the bottom of the reservoir, means for delivering cooling medium to the passage for cooling the wall, a shaft extending through the reservoir, bearings at the opposite ends of the reservoir for the shaft, splashers on the shaft for splashing oil upon the bearings, means in the casing in the transverse planes of the splashers to deflect oil hurled by the splashers to the bearings, and dams on the opposite sides of the reservoir extending longitudinally through the reservoir on the wall from one bearing to another to receive oil thrown by the splashers and having ports intermediate their ends to deliver such oil to the portion of the wall lying between the dams.

2. An oiling device, comprising a casing having a wall to divide the casing into a reservoir for oil and a passage for cooling medium, said wall forming the bottom of the reservoir, means for delivering cooling medium to the passage for cooling the wall, a shaft extending through the reservoir, bearings at the opposite ends of the reservoir for the shaft, means in the casing having recesses adjacent the bearings and passages leading from the recesses to the bearings, splashers on the shaft extending into the recesses for splashing oil from the reservoir into the recesses for oiling the bearings, dams extending longitudinally along the wall between the bearings to receive oil thrown against the surface of the casing by the splashers and having ports intermediate their ends to deliver such oil to the portion of the wall lying between the dams.

ANTHONY L. McHUGH.